3 Sheets—Sheet 1.
B. FISCHER.
Machine for Grinding Glassware.
No. 212,674. Patented Feb. 25, 1879.
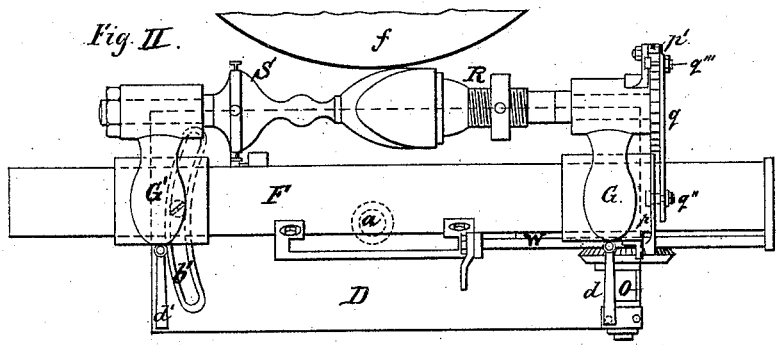
Fig. II.
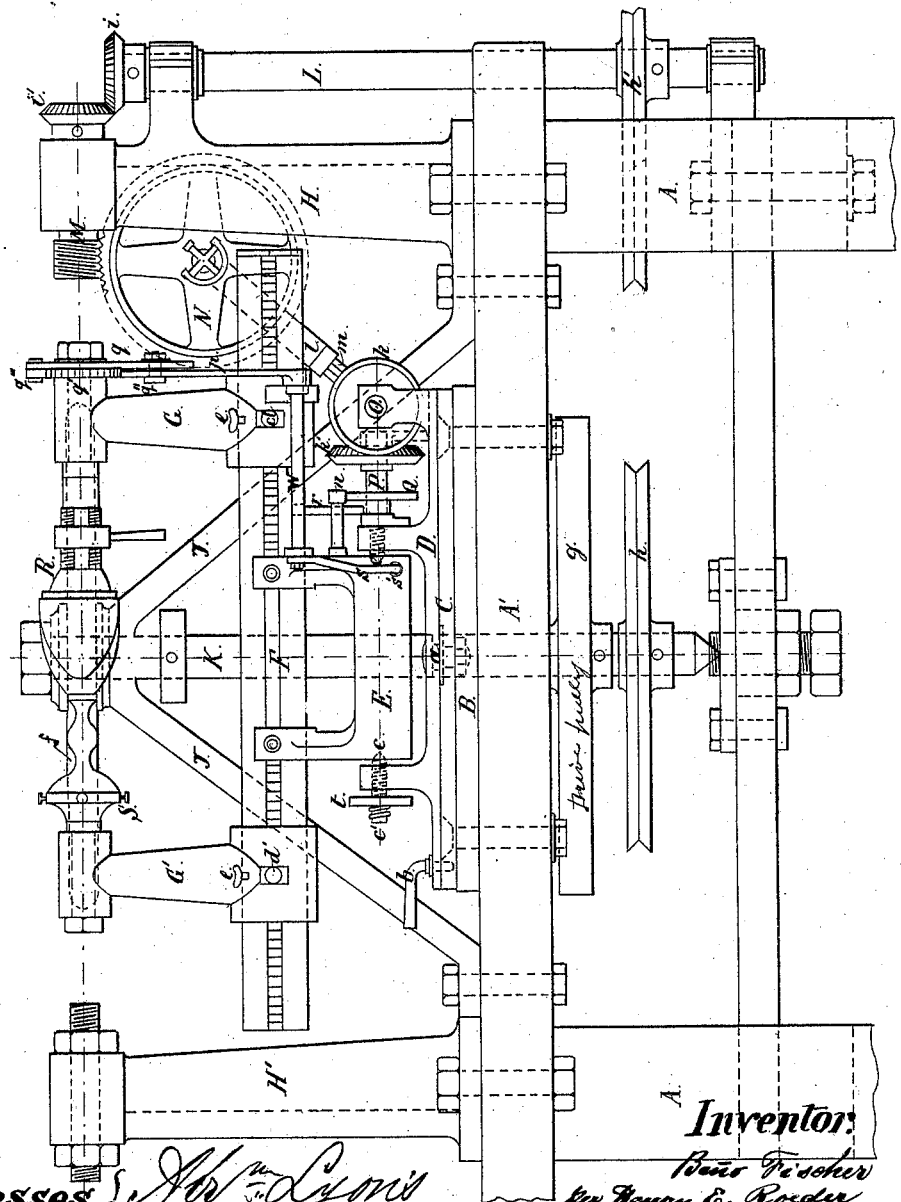
Fig. I
Witnesses
Inventor

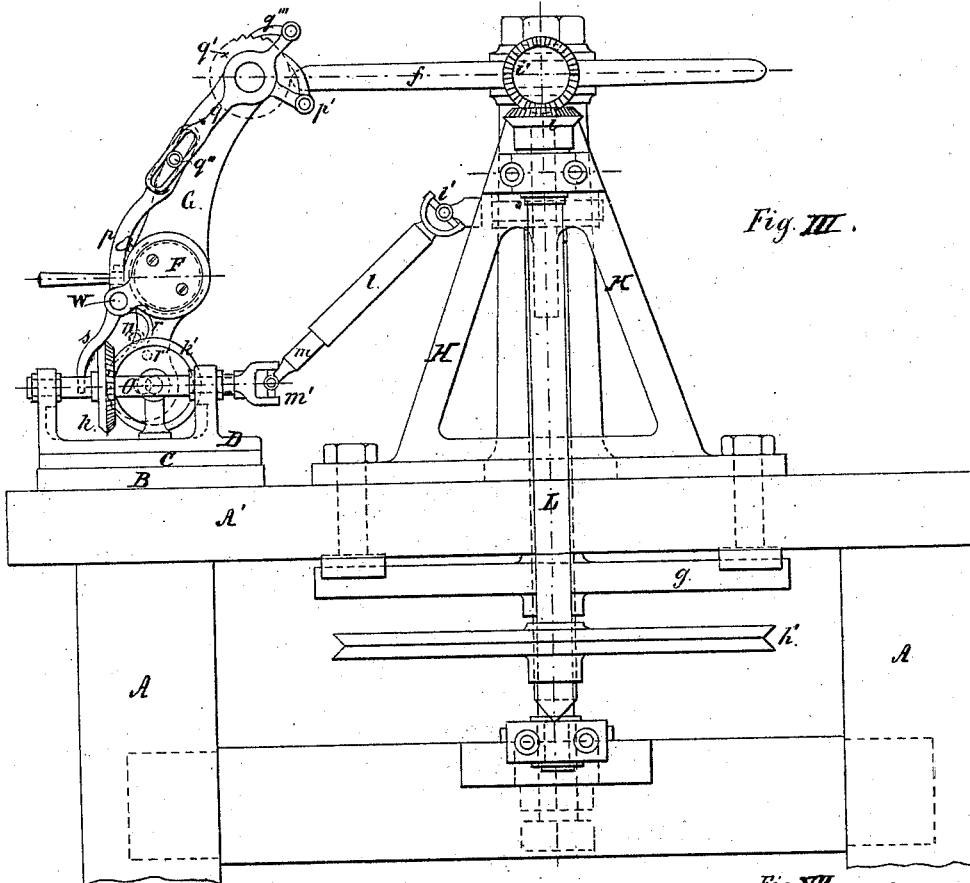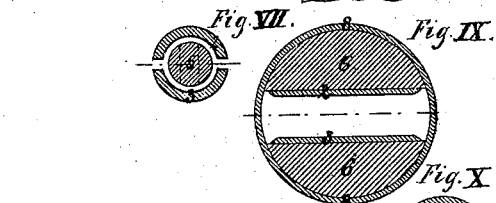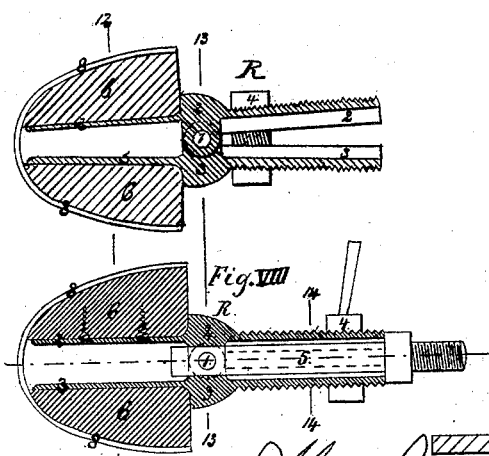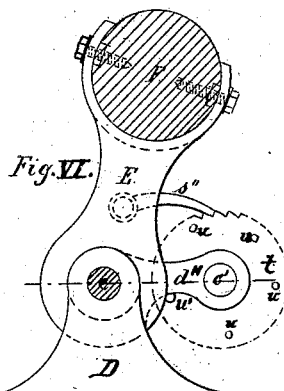

B. FISCHER.
Machine for Grinding Glassware.
No. 212,674. Patented Feb. 25, 1879.
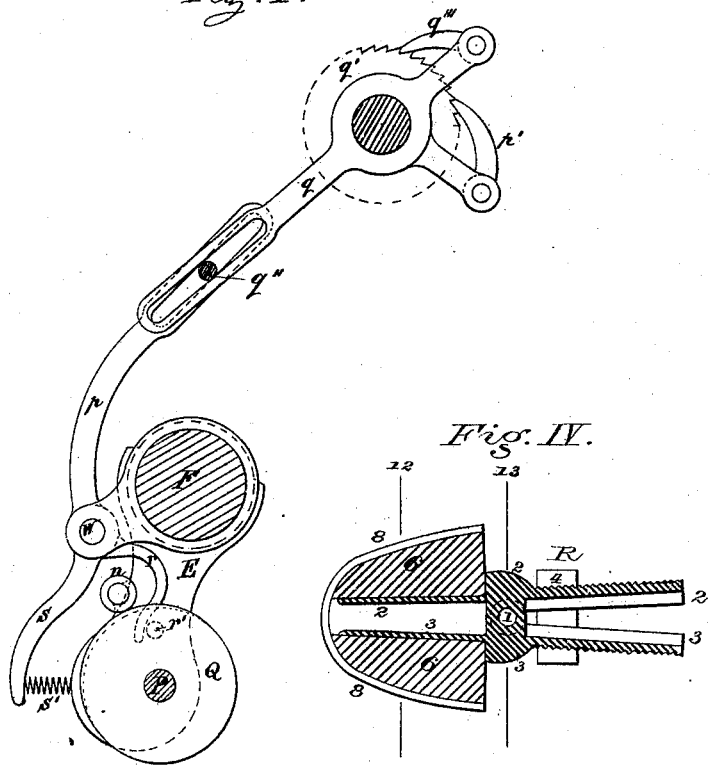
Witnesses
Inventor.

UNITED STATES PATENT OFFICE.

BENNO FISCHER, OF FENNER-GLASHÜTTE, NEAR SAARBRÜCKEN, GERMANY.

IMPROVEMENT IN MACHINES FOR GRINDING GLASSWARE.

Specification forming part of Letters Patent No. 212,674, dated February 25, 1879; application filed July 16, 1878.

*To all whom it may concern:*

Be it known that I, BENNO FISCHER, of Fenner-Glashütte, near Saarbrücken, in the Empire of Germany, have invented new and useful Improvements in Machines for Cutting and Polishing Flat and Concave Surfaces on Drinking Glasses and Vases, of which the following is a specification:

The purpose of this machine is to grind or cut either flat or concave surfaces on the circumference of the drinking glasses or vases in a self-acting manner and of a regular division.

My machine works perfectly self-acting and answers all my expectations, requiring only the putting in of the holding device of the glass. One workman can attend to several machines.

The machine can be readily adjusted for any number of surfaces which are to be cut upon a glass.

The glass, after all surfaces have been cut and polished, and when an entire revolution has been made, is kept still by a mechanism without being obliged to stop the machine.

In the accompanying drawings, Figure I represents a front view of the machine. Fig. II is a top view of part of the machine. Fig. III is a side elevation. The other figures represent details referred to in the description.

Similar letters of reference represent similar parts in all the figures.

The machine is fastened on a suitable frame, A, to the table-plate A' of which the bed-plate C of the machine is fixed, having the wooden sole B between. The support D is attached to the bed-plate C by a screw, *a*, capable of turning around said bolt, whereby the holding device for fixing the glass to be ground and cut can be placed at any angle, so as to bring the surface of the glass rightly against the grindstone. Having the apparatus exactly placed, this support D is fixed on the bed-plate C by means of the handle-screw *b*, working in the circular groove *b'*, Fig. II, so that no deviation can take place during the activity of the machine.

The frame E oscillates upon the points *c c*, Figs. I and VI, attached to the support D, and carries a long cylinder, F, having two standards, G and G', capable of sliding upon said cylinder. To prevent the standards from turning, keys have been introduced, which slide in a groove in the cylinder F. In a second groove a rack is placed, into which the screws *d d'* engage. When the standards are placed in their required position upon the cylinder F, by means of these screws *d d'*, they are fastened by the thumb-screws *e e*. In consequence of this arrangement the pieces E F and G G' oscillate, commonly in the points *c c*, between the arms of the support D.

The vertical axis K, carrying the grindstone *f*, the pulley *g*, and the grooved pulley *h*, runs below in a point and above in a bracket, J, fastened to the table-plate A', and receives its rotation through a belt over the pulley *g*.

The grooved pulley *h* transmits the motion, by means of a belt to the grooved pulley *h'*, to the vertical auxiliary shaft L, and through the bevel-gear *i i'* to the worm M, gearing into the screw-wheel N. This worm-wheel, lying in bearings attached to the fixed standard H, gives motion to the axis O (see Fig. III) through the connecting-rod *l*, furnished with universal joints at its extremities *l'* and *m'*. This connecting-rod *l* consists of a partly-hollowed piece, *l*, and a sliding rod, *m*, prevented from turning by a suitable key sliding in a keyway in the piece *l*, but which allows to alter the length of the rod to a certain extent. This arrangement provided with universal joints allows the adjusting of the apparatus to any angle with the grindstone.

On an axis, P, a cam, Q, Figs. I and V, is placed. This axis receives its motion from the shaft O through the gear-wheels *k* and *k'*. When the projecting part of this cam Q comes in contact with the friction-roller *n*, attached to the frame E, the pieces E F G G', forming the frame, are rapidly withdrawn from the grindstone at a distance of some centimeters. After that the glass is turned for the purpose of grinding the next surface, and then allowed to move slowly toward the grindstone.

Into the upper part of the standard G a bolt, 5, Fig. VIII, is fastened, which carries a kind of a chuck, R, for the purpose of fixing the glass or vessel to be ground. This chuck R, Figs. VIII and IV, consists of the two fork-shaped pieces 2 and 3, turning about the pin 1 like a pair of scissors, operated by a nut, 4. These parts 2 and 3, embracing the bolt or rod 5, form at one end a screw cut in two parts, (see Figs. VIII, IV, and VII,) which latter shows a section at line 14 of Fig. VIII, being conical toward the fore end, upon which a nut, 4, is made to work. By screwing up the nut 4 the flask or chuck is opened or expanded at the opposite side, to which are fastened wood pieces 6, Figs. VIII and IX, which latter figure shows a section at line 2 of Figs. IV and VIII, the external form of which corresponds with the hollow part of the glass or vessel to be put in. These wood pieces 6 are covered with a cap, 8, of india-rubber or other elastic substance, (Figs. VIII, IV, and IX,) exerting thus an elastic pressure upon the inner side of the glass. By screwing back the nut 4, as shown in Fig. IV, the wood pieces 6 are brought into their primitive position again, on account of the elasticity of the india-rubber cap 8.

Fig. X shows a section at line 14 of Fig. VIII.

In the standard G' a chuck, S, provided with four set-screws, is fixed for the purpose of setting the glass true, and to hold it fast.

Both the chucks R and S are capable of turning in their respective standards. It will readily be understood that the position of the chucks may be changed from one standard to the other, as may be found more convenient.

The rotation of the glass is accomplished in the following manner: A bar, W, Figs. I, II, III, and V, is fixed to the cylinder F, parallel with the same. Upon this bar W a lever, $p$, is placed, capable of moving at the same time with the standard G. This lever $p$ is connected to a lever, $q$, Figs. I and V, by means of a fork and bolt, $q''$. The lever $q$ has its fulcrum upon the bolt of the chuck attached to the standard G, and upon which bolt a ratchet, $q'$, is fixed, having teeth on its circumference, which receive a pawl, $q'''$, placed on the upper part of the lever $q$.

To the bar W a bent arm, $r$, is attached, which, at the proper time, comes in contact with a pin, $r'$, attached to the eccentric disk or cam Q. This action occasions the lever $p$, as well as the lever $q$, to oscillate, and causes the pawl $q'''$ to turn the ratchet $q'$. For instance, if there are ten places to be ground on the glass, the pawl $q'''$ is to push or turn the ratchet $q'$ every time for the tenth part of its circumference. The course of the pawl $q'''$ or its amount of motion is regulated by the position of the binding-screw $q''$ in the fork, which connects the levers $p$ and $q$ to each other. As soon as the ratchet has been turned the levers are brought to their primitive position by means of a suitable spring, $s'$, acting against an arm, $s$, attached to the bar W. In order to prevent the glass from turning during this retrograde movement of the levers a second pawl, $p'$, Figs. II and III, is attached to the standard G.

The glass, after having made an entire revolution, is prevented from moving any farther by the mechanism shown in Fig. VI, without, however, stopping the grindstone.

To the standard D a bracket, $d''$, is fixed, to which a ratchet, $t$, is attached capable of turning on its center $c'$. This ratchet is toothed on its circumference, into which said teeth a pawl, $s''$, attached to the frame E, is made to work. In this ratchet $t$ a number of holes, $u$, is made, placed in such a manner as to correspond to the number of cuts or facets to be ground on the glass, and a pin, $u'$, is fastened to either of these holes $u$ corresponding with the required number of facets to be cut.

When the frame E is moved backward by the cam Q, coming in contact with the roller $n$, it takes the pawl $s''$ with it, and thus causes the latter to gear into the following tooth. During this motion the ratchet $t$ is kept fast by friction produced by means of a suitable spring. During the forward motion of the frame E this pawl $s''$ turns the ratchet $t$ a certain distance around.

When the pawl $s''$ has moved the dividing-plate $t$ as often as there are surfaces or facets to be ground on the glass, the pin $u'$ strikes at the under side of the bracket $d''$ and prevents the pieces E F G G', and consequently the glass, from advancing to the grindstone. This operation of preventing the glass or vessel from being brought against the grindstone does not necessitate the stopping of the machine, as the raised part of the cam Q can pass freely below the friction-roller $n$.

In designing this machine I paid much attention to give all parts such a form that they cannot be attacked by the fine sand of the glass.

The manner of operating is as follows: First, fix the glass to be ground or cut between the chucks R and S. Glasses or vessels of irregular form can easily be centered by means of the set-screws in chuck S; second, attach the proper ratchet $q'$, having the necessary number of teeth for the required division of surfaces or facets to be ground or cut on the glass or vessel; third, regulate the course or amount of motion of the pawl $q'''$ by means of the binding-screw $q''$, which unites the levers $p$ and $q$; fourth, place the pin $u'$ into that hole in the ratchet $t$ which corresponds with the number of facets to be ground on the glass; fifth, adjust the apparatus carrying the glass or vessel to be cut and ground by turning the same in the proper direction on the bolt $a$, and secure it firmly in this position by means of the hand-screw $b$.

After having everything arranged as described the machine can be put in motion. The face or circumference of the cam or eccentric disk Q is so shaped as to allow the apparatus carrying the glass or vessel to be cut and ground to move slowly toward the grindstone, and to avoid thereby the breaking of the glass, which might be produced by a violent shock. The eccentric-disk Q makes one revolution during the time (about forty seconds) which is required to grind a facet upon the glass. When the grinding of one facet is accomplished, the glass is, by the above-described mechanism, in a self-acting manner rapidly moved away from the grindstone, and when at its greatest distance from the same the glass is turned for the following facet. This operation is repeated until the desired and fixed number of facets are ground, when the rotation of the glass is interrupted by the described stopping mechanism shown in Fig. VI.

In the construction of the frame for holding the glass or vessel under operation, the circular form of the part F, upon which the standards G and G' can slide and are secured by means of a suitable rack and screws $d\ d'$, has been chosen, for the purpose of preventing any deposit of glass-sand and other impurities on this part of the frame.

What I claim as my invention, and desire to secure by Letters Patent, is—

1. The frame E, cylinder F, with standards G G', forming a frame supported on centers $c\ c$, fast to the support D, and the chucks R and S in the end of the standards G G', in combination with a grindstone, $f$, constructed and arranged to operate substantially in the manner and for the purpose described.

2. In combination with the frame E F G G' and friction-roller $n$, attached to said frame, the cam Q, arranged to operate as and for the purpose substantially as set forth.

3. In combination with the frame E F G G', bar W, levers $p$ and $q$, connected by movable bolt $q''$, pawl $q'''$, ratchet $q'$, and bent lever $r$, the rotating disk Q, with stud or pin $r'$ attached, arranged to operate substantially in the manner and for the purpose described.

4. In combination with the frame E F G G' and pawl $s''$, the fixed bracket $d''$, with ratchet $t$, provided with a series of holes, $u$, and pin or stud $u'$, arranged in the manner and for the purpose specified.

5. The chuck R, consisting of the combination of bolt 5, jointed levers 2 and 3, with nut 4 on one end and blocks 6 6 at their other end, covered with an india-rubber cap, 8, the whole being arranged to operate substantially as and for the purpose described.

6. The combination of the shaft L, receiving its motion from the main shaft K, the gear-wheels $i\ i'$, worm M, wheel N, adjustable rod $l\ m$, provided with universal joints $l'\ m'$ at its end, shaft O, gear-wheel $k\ k'$, shaft P, and cam Q, arranged to operate substantially in the manner and for the purpose herein described.

BENNO FISCHER.

Witnesses:
H. RASPILLER,
G. BRINY.